(12) United States Patent
Gamble

(10) Patent No.: US 9,365,107 B2
(45) Date of Patent: Jun. 14, 2016

(54) FUEL TANK VENT APPARATUS

(71) Applicant: Stant USA Corp., Connersville, IN (US)

(72) Inventor: Jimmy D Gamble, Connersville, IN (US)

(73) Assignee: Stant USA Corp., Connersville, IN (US)

(*) Notice: Subject to any disclaimer, the term of this patent is extended or adjusted under 35 U.S.C. 154(b) by 280 days.

(21) Appl. No.: 14/015,667

(22) Filed: Aug. 30, 2013

(65) Prior Publication Data

US 2014/0060665 A1 Mar. 6, 2014

Related U.S. Application Data

(60) Provisional application No. 61/695,549, filed on Aug. 31, 2012.

(51) Int. Cl.
*F16K 24/04* (2006.01)
*B60K 15/035* (2006.01)

(52) U.S. Cl.
CPC ......... *B60K 15/03519* (2013.01); *F16K 24/044* (2013.01); *Y10T 137/3099* (2015.04)

(58) Field of Classification Search
CPC ..... F16K 24/04; F16K 24/042; F16K 24/044; B60K 2015/03504; B60K 2015/03514; B60K 2015/03542; B60K 15/03519
USPC ....................................................... 137/202
See application file for complete search history.

(56) References Cited

U.S. PATENT DOCUMENTS

| | | | |
|---|---|---|---|
| 4,694,847 A | 9/1987 | Szlaga | |
| 4,753,262 A | 6/1988 | Bergsma | |
| 4,760,858 A | 8/1988 | Szlaga | |
| 5,065,782 A | 11/1991 | Szlaga | |
| 5,313,977 A | 5/1994 | Bergsma et al. | |
| 5,605,175 A | 2/1997 | Bergsma et al. | |
| 5,832,950 A * | 11/1998 | Shimada et al. | 137/202 |
| 5,944,044 A * | 8/1999 | King et al. | 137/202 |
| 5,950,655 A * | 9/1999 | Benjey | 137/43 |
| 6,003,499 A | 12/1999 | Devall et al. | |
| 6,085,771 A | 7/2000 | Benjey et al. | |
| 6,240,950 B1 * | 6/2001 | Harris | 137/202 |
| 6,895,943 B1 | 5/2005 | Taxon | |
| 2002/0011265 A1 * | 1/2002 | Ganachaud | B60K 15/03519 137/43 |
| 2002/0017281 A1 | 2/2002 | Crary et al. | |
| 2004/0238033 A1 * | 12/2004 | Miyoshi et al. | 137/202 |
| 2005/0126633 A1 * | 6/2005 | Leonhardt | 137/202 |
| 2007/0169842 A1 | 7/2007 | King | |
| 2008/0092962 A1 * | 4/2008 | Theissler et al. | 137/587 |
| 2008/0236672 A1 * | 10/2008 | Horiba et al. | 137/15.26 |
| 2009/0314357 A1 | 12/2009 | Arnalsteen et al. | |
| 2010/0072203 A1 | 3/2010 | Nishi et al. | |

OTHER PUBLICATIONS

PCT Search Report and Written Opinion completed by the ISA/US on Mar. 25, 2014 and issued in connection with PCT/US2013/057550.
Invitation to Pay Additional Fees issued by the ISA/US on Feb. 6, 2014.

* cited by examiner

*Primary Examiner* — William McCalister
*Assistant Examiner* — Ian Paquette
(74) *Attorney, Agent, or Firm* — Barnes & Thornburg LLP

(57) ABSTRACT

A fuel tank vent apparatus for controlling discharge of fuel vapor from an interior region in a fuel tank includes a housing and a valve received in the housing that moves between an open position and a closed position. The valve assumes the open position when the fuel level in the fuel tank is relatively low and the valve assumes the closed position when the fuel level in the fuel tank is relatively high.

21 Claims, 12 Drawing Sheets

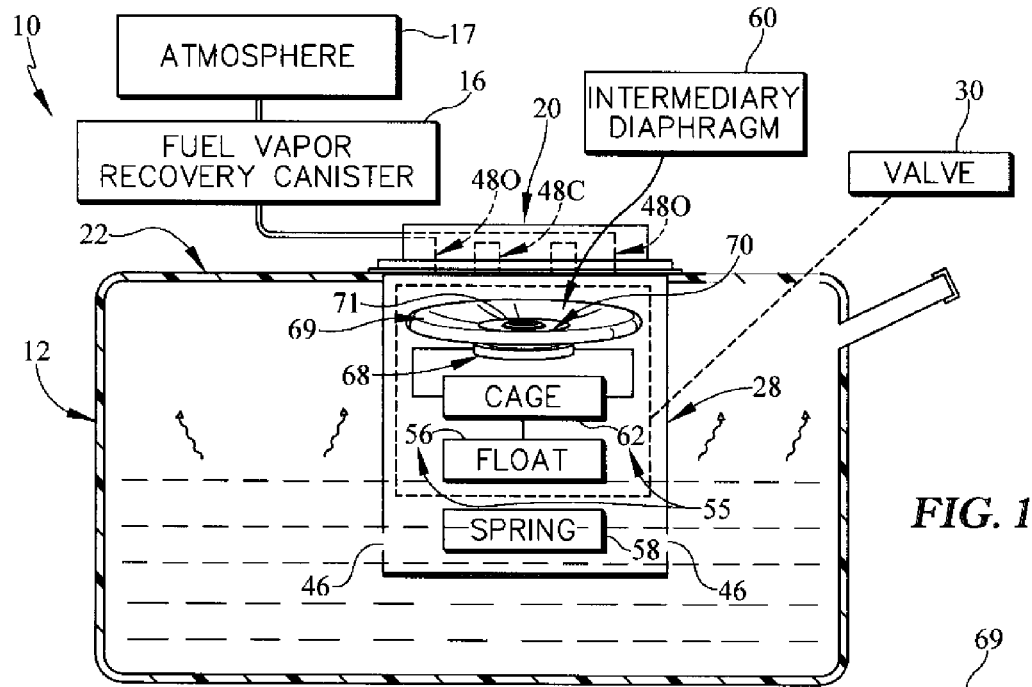
FIG. 1
FIG. 3
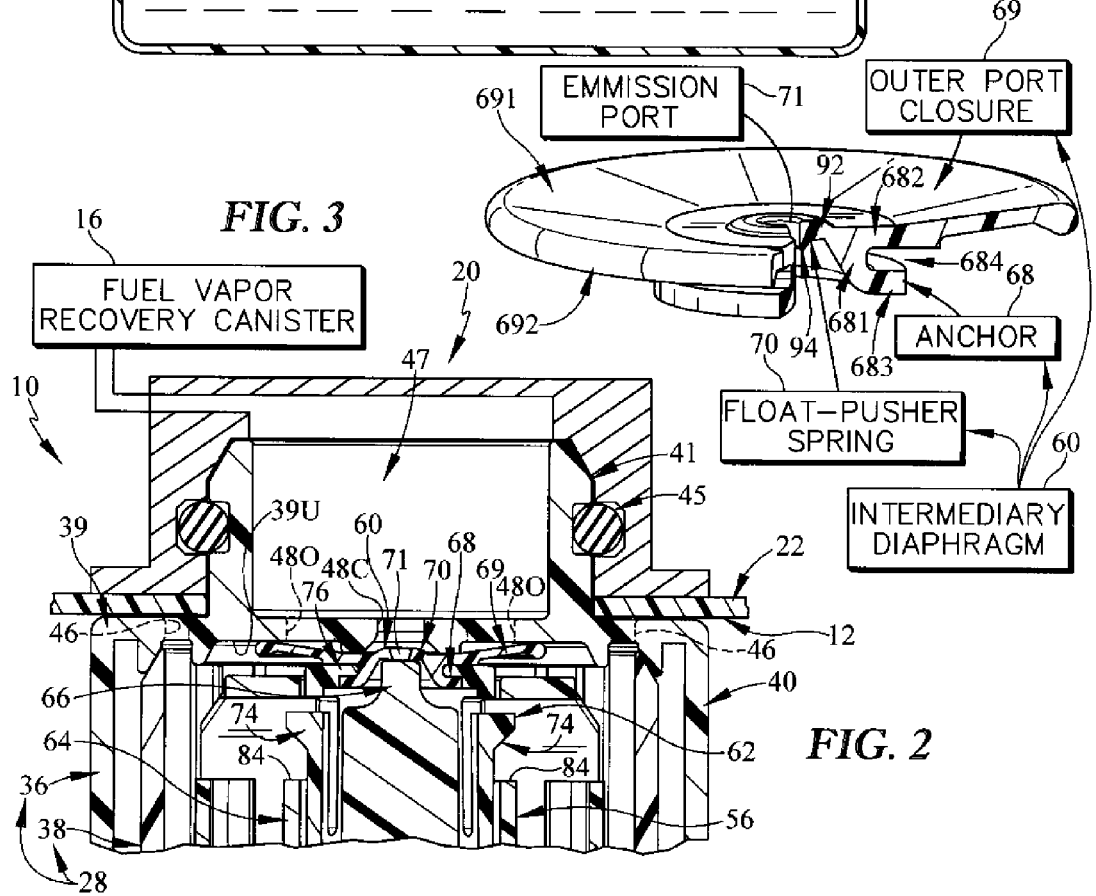
FIG. 2

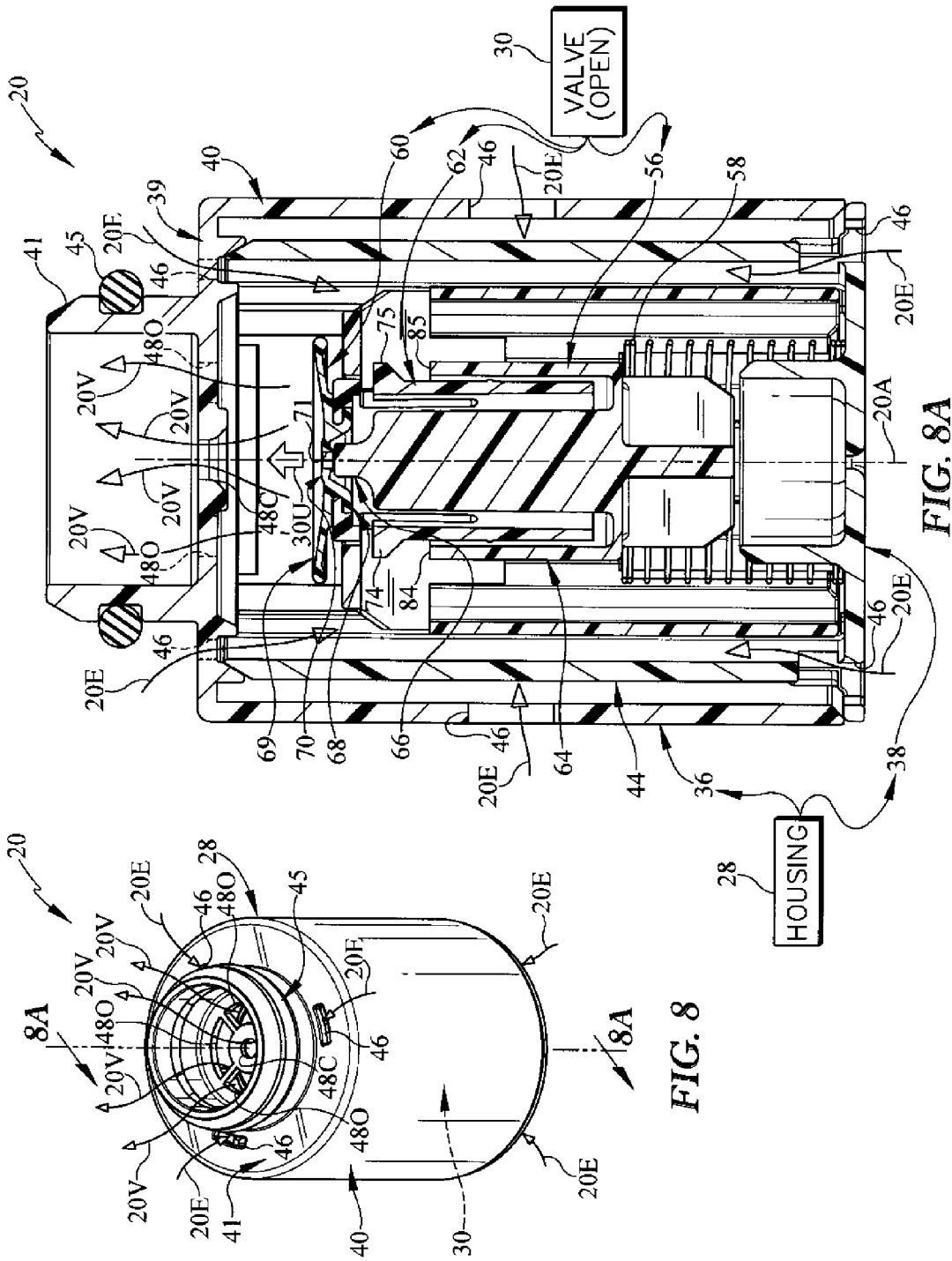

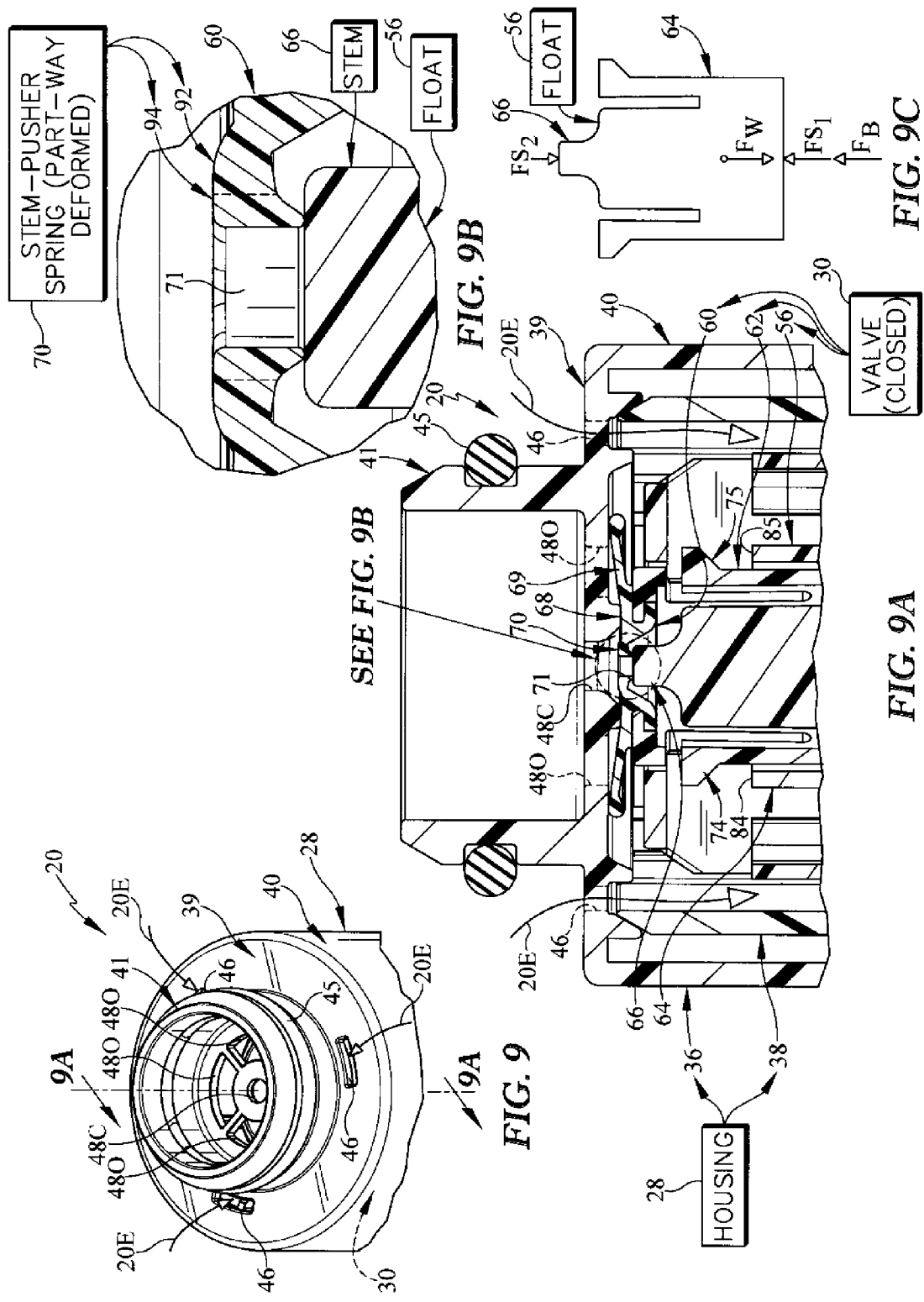

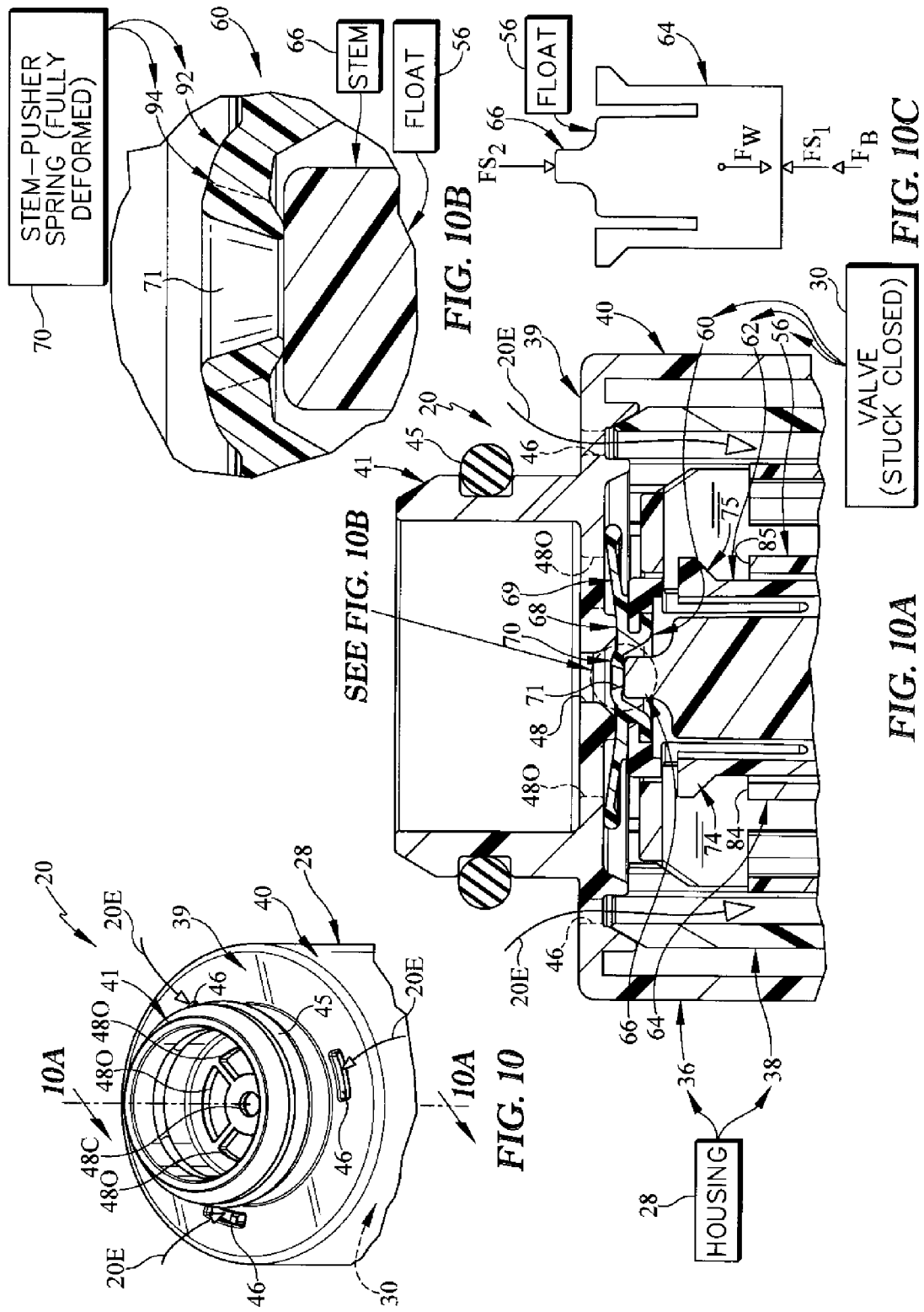

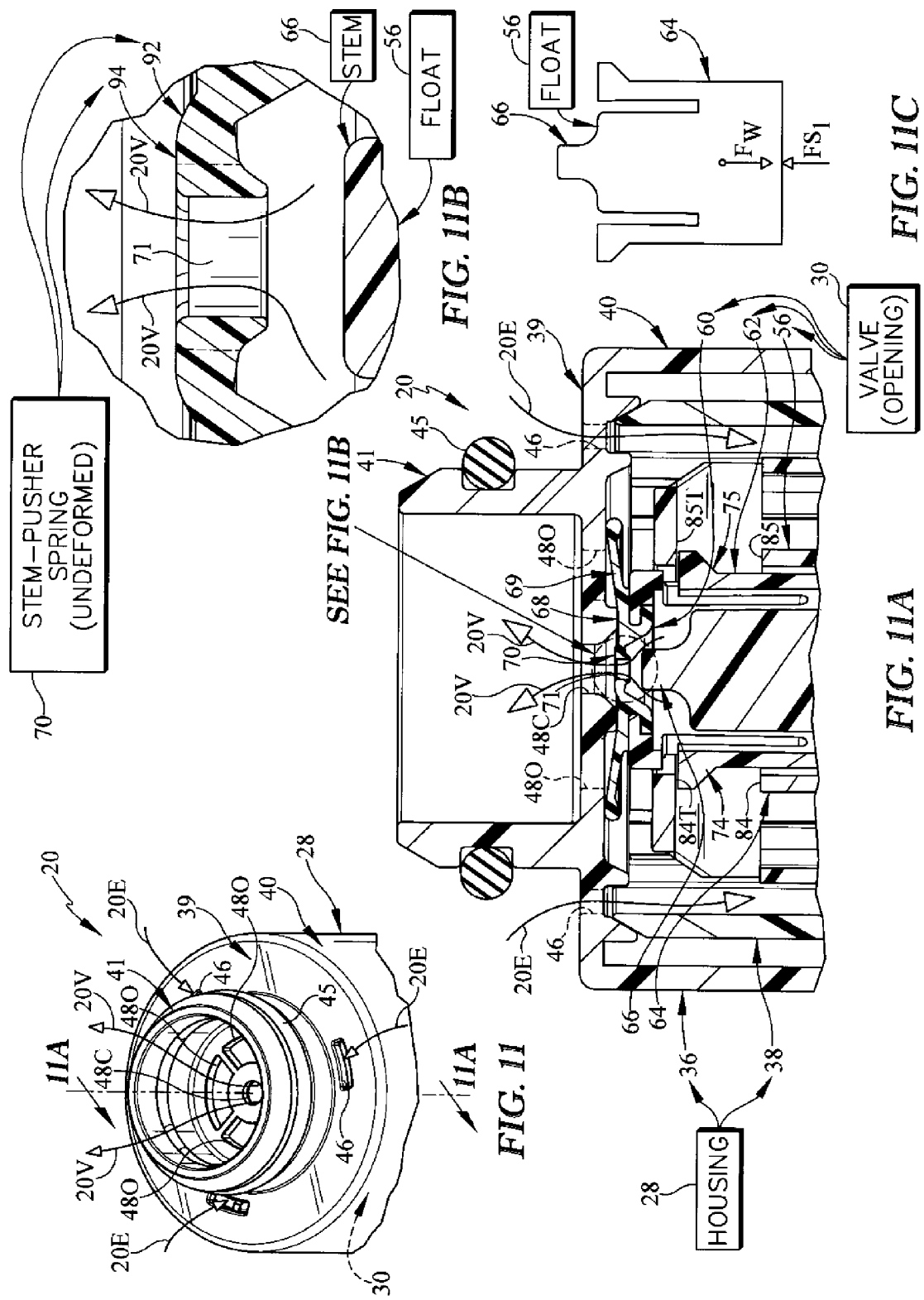

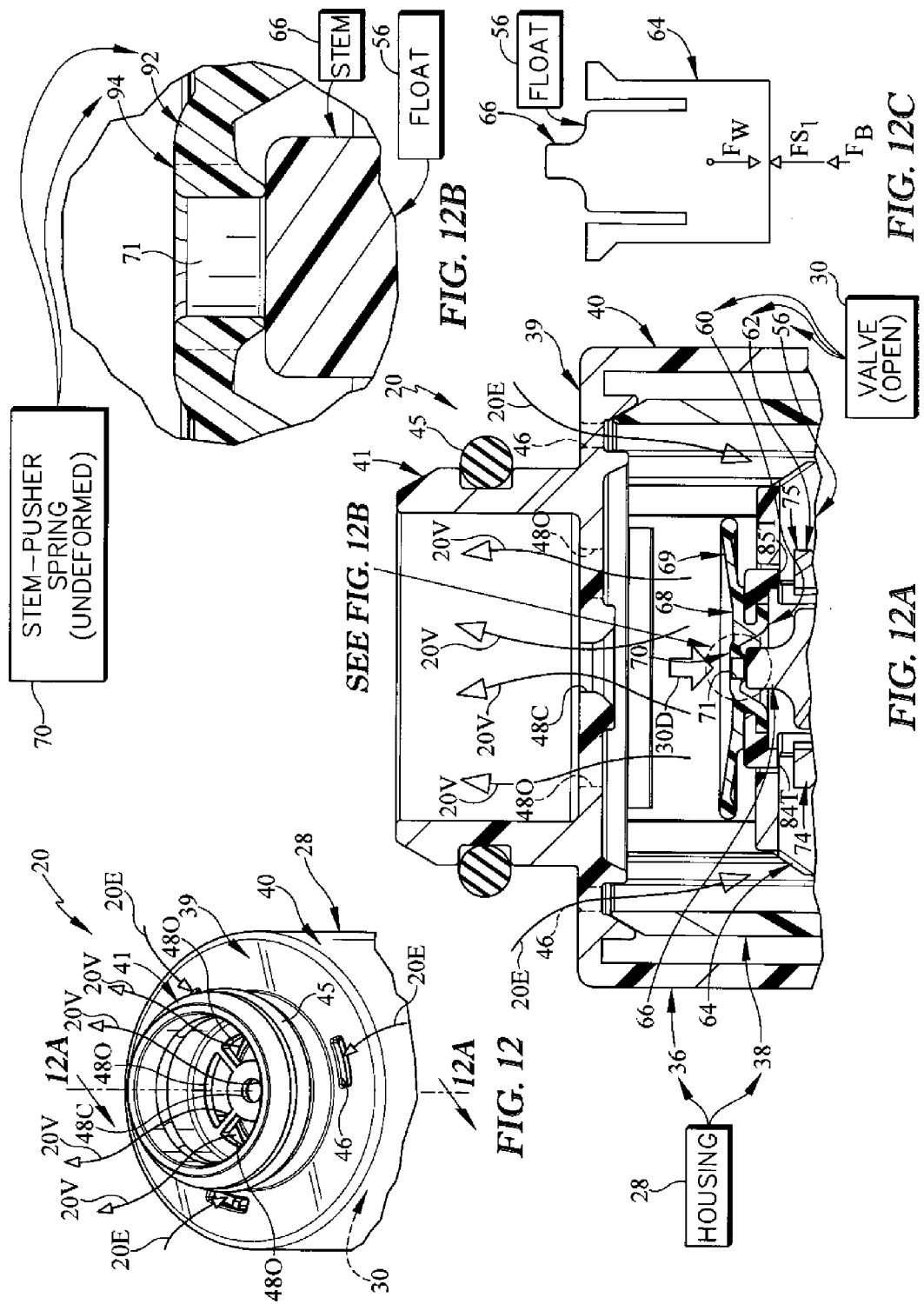

US 9,365,107 B2

FUEL TANK VENT APPARATUS

PRIORITY CLAIM

This application claims priority under 35 U.S.C. §119(e) to U.S. Provisional Application Ser. No. 61/695,549, filed Aug. 31, 2012, which is expressly incorporated by reference herein.

BACKGROUND

The present disclosure relates to a fuel tank vent apparatus included in a vehicle fuel storage system, and particularly to a fuel tank vent apparatus for controlling venting of a fuel tank. More particularly, the present disclosure relates to a fuel tank vent apparatus including a housing and a buoyant float received in the housing that is lifted and lowered within the housing by the rising and falling of fuel in the fuel tank.

SUMMARY

A fuel tank vent apparatus is adapted to be mounted to a fuel tank to allow fuel vapor to escape from the fuel tank when fuel level in the fuel tank is low and to block liquid fuel and fuel vapor from escaping from the fuel tank when the fuel level in the fuel tank in high. The fuel tank vent apparatus includes a housing extending into the fuel tank and a valve received in the housing that moves between an open position and a closed position. The valve assumes the open position when the fuel level in the fuel tank is low allowing fuel vapor to escape from the fuel tank through vent ports formed in the housing of the fuel tank vent apparatus. The valve assumes the closed position when the fuel level in the fuel tank is high blocking liquid fuel and fuel vapor from sloshing out of the fuel tank through the vent ports formed in the housing.

In illustrative embodiments, the valve includes a buoyant float and an intermediary diaphragm arranged between the float and the vent ports formed in the housing. The buoyant float is lifted by the fuel level in the fuel tank. The intermediary diaphragm is lifted with the buoyant float and cooperates with the buoyant float to close the vent ports when the valve is in the closed position so that liquid fuel and fuel vapor are blocked from escaping through the housing.

In illustrative embodiments, the intermediary diaphragm is formed to include an emission port and a float-pusher spring. The emission port is closed by the buoyant float when the buoyant float is lifted by high levels of liquid fuel in the fuel tank. The float-pusher spring of the intermediary diaphragm stores energy developed by the rising of the float and by increasing pressure inside the fuel tank. The float-pusher spring applies the stored energy to the buoyant float to push the buoyant float downwardly, away from the emission port, to open the emission port when liquid fuel levels in the fuel tank are lowered. The open emission port allows some fuel vapor to escape the internal space through the emission port and a central vent port formed in the housing so that the valve is able to fully re-open as the buoyant float and the intermediary diaphragm fall away from the vent ports releasing the built up pressure in the fuel tank.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a partially diagrammatic view of a fuel storage system including a fuel tank, a fuel vapor recovery canister located outside the fuel tank, and a fuel tank vent apparatus for venting pressurized fuel vapor from the fuel tank to the fuel vapor recovery canister when pressure in the fuel tank is greater than atmospheric pressure outside the fuel tank showing that the fuel tank vent apparatus includes a housing mounted in the top wall of the fuel tank, a multi-part valve arranged inside the housing, and a spring arranged inside the housing and showing that the valve includes a buoyant float adapted to be lifted by liquid fuel in the fuel tank, an intermediary diaphragm arranged between the buoyant float and a ceiling of the housing, and a diaphragm-support cage coupled between the buoyant float and the intermediary diaphragm;

FIG. 2 is a cross-sectional view of a portion of the fuel storage system of FIG. 1 showing the valve closing vent ports formed in the ceiling of the housing when the buoyant float is lifted by liquid fuel in the fuel tank so that liquid fuel is blocked from splashing out through the vent port, showing that the intermediary diaphragm of the valve is formed to include an emission port that aligns with a central vent port, and showing that the buoyant float closes the emission port formed in the intermediary diaphragm when the valve is closed;

FIG. 3 is a cut-away perspective view of the intermediary diaphragm of FIGS. 1 and 2 showing that the intermediary diaphragm is a monolithic component formed to include an outer vent port closure sized to close outer vent ports arranged radially outward of the central vent port when the valve is closed, an anchor extending radially inward from the outer vent port closure and configured to couple the intermediary diaphragm to the diaphragm-support cage, and a float-pusher spring extending radially inward from the anchor and configured to provide means for storing energy by deforming as the buoyant float is lifted, as shown in FIG. 3A, and for applying the stored energy to the buoyant float to push the buoyant float downwardly away from the emission port, as shown in FIG. 3B, to thereby open the emission port allowing some fuel vapor to escape the internal space through the emission port and the central vent port when the buoyant float is not held in contact with the intermediary diaphragm by liquid fuel in the internal space after the level of liquid fuel is reduced during operation of a vehicle;

FIG. 3A is a detail cross-sectional view of a portion of the fuel vapor recover canister showing the float-pusher spring included in the intermediary diaphragm deformed to store energy and showing that the float-pusher spring applies the stored energy to the buoyant float to push the buoyant float downwardly, away from the emission port formed in the intermediary diaphragm to open the emission port and allow some fuel vapor to escape the internal space as shown in FIG. 3B;

FIG. 3B is a view similar to FIG. 3A showing the float-pusher spring of the intermediary diaphragm after pushing the buoyant float downwardly away from the emission port formed in the intermediary diaphragm to open the emission port and allow some fuel vapor to escape the internal space;

FIGS. 4A-4D are a series of partially-diagrammatic views of a fuel storage system including a fuel tank located near an exhaust system, a fuel vapor recovery canister located outside the fuel tank, and the fuel tank vent apparatus of FIGS. 1-3 for venting pressurized fuel vapor from the fuel tank to the fuel vapor recovery canister when pressure in the fuel tank is greater than atmospheric pressure outside the fuel tank, the views showing that the fuel tank vent apparatus includes a housing mounted in the top wall of the fuel tank and a valve movable within an internal space formed by the housing from an open position that allows fuel vapor to escape the fuel tank when fuel level in the fuel tank is low, as shown in FIG. 4A, to a closed position that blocks fuel vapor and fuel from escaping the fuel tank when fuel level in the fuel tank is high, as shown in FIG. 4B, and showing that the valve in the closed position as fuel from the fuel tank is consumed, as shown in FIG. 4C, prior to the valve being reopened by an intermediary diaphragm included in the valve that pushes downwardly on the buoyant float included in the valve from the housing in response to increased pressure building in the fuel tank as suggested in FIG. 4D;

FIG. 4A is a diagrammatic view of the fuel storage system showing the valve of the fuel tank vent apparatus in the open position allowing fuel vapor in the fuel tank to escape the fuel tank through the fuel tank vent apparatus prior to the fuel tank being filled, as shown in FIG. 4B, and showing diagrammatically that the valve includes a spring, the buoyant float, a seal support, and the intermediary diaphragm;

FIG. 4B is a view similar to FIG. 4A showing the valve of the fuel tank vent apparatus lifted by the fuel in the fuel tank to the closed position blocking fuel vapor and fuel in the fuel tank from escaping the fuel tank through the fuel tank vent apparatus when the fuel level in the fuel tank is high;

FIG. 4C is a view similar to FIGS. 4A and 4B showing the valve of the fuel tank vent apparatus in the closed position blocking fuel vapor in the fuel tank from escaping the fuel tank through the fuel tank vent apparatus after the level of fuel in the fuel tank is lowered by fuel use prior to the valve being re-opened to allow fuel vapor in the fuel tank to escape during fuel use as shown in FIG. 4D;

FIG. 4D is a view similar to FIGS. 4A-4C showing the valve of the fuel tank vent apparatus in the open position after being re-opened to allow fuel vapor in the fuel tank to escape the fuel tank through the fuel tank vent apparatus as the level of fuel in the fuel tank is lowered by fuel use;

FIG. 5 is a diagrammatic view of the fuel tank vent apparatus of FIGS. 1-4D showing that the bias spring is arranged between a floor of the housing and the valve to provide some pre-loaded lift to the valve inside the housing, showing that the valve includes the buoyant float, the intermediary diaphragm, and the diaphragm-support cage interconnecting the buoyant float and the intermediary diaphragm, and suggesting that the float-pusher spring included in the intermediary diaphragm is adapted to push downwardly on the buoyant float;

FIG. 6 is an exploded perspective view of an exemplary fuel tank vent apparatus in accordance with FIGS. 1-5 showing that the housing includes a lower shell and an upper shell that cooperate to form the internal space in which the valve is located, and showing that the exemplary valve includes the buoyant float, the diaphragm-support cage, and the intermediary diaphragm;

FIG. 7 is a perspective view of the fuel tank vent apparatus of FIG. 6 cut away to show the assembled valve situated in the internal space of the housing and showing that the diaphragm-support cage includes a central cylindrical body and arms extending outwardly from the central cylindrical body into slots formed in the buoyant body of the buoyant float to couple the intermediary diaphragm to the buoyant float while allowing a predetermined amount of motion of the buoyant float relative to the intermediary diaphragm as shown in FIGS. 11A and 11B;

FIG. 8 is a perspective view of the exemplary fuel tank vent apparatus with the valve in the open position corresponding to FIG. 4A showing that fuel vapor is entering the fuel tank vent apparatus through inlet ports formed in the ceiling and the side walls of the housing and is exiting the fuel tank vent apparatus through the vent ports formed in the ceiling of the housing;

FIG. 8A is a cross-sectional view of the fuel tank vent apparatus of FIG. 8 taken along line 8A-8A showing the valve in the open position spaced apart from the ceiling of the housing;

FIG. 9 is a perspective view of a portion of the fuel tank vent apparatus in the closed position corresponding to FIG. 4B showing that fuel vapor is allowed to enter the fuel tank vent apparatus through the inlet ports of the housing but are blocked from exiting the fuel tank vent apparatus through the vent ports;

Figure 4A:
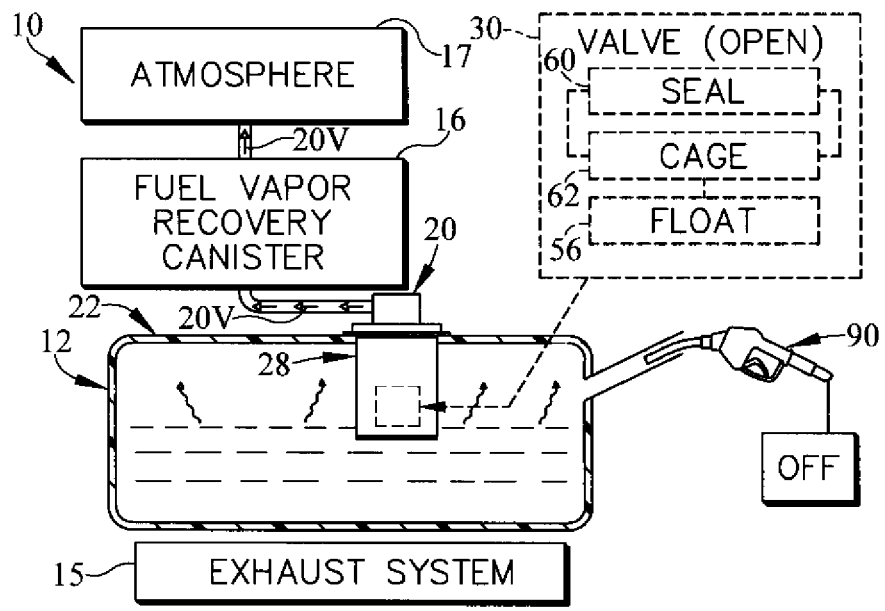
Figure 4B:
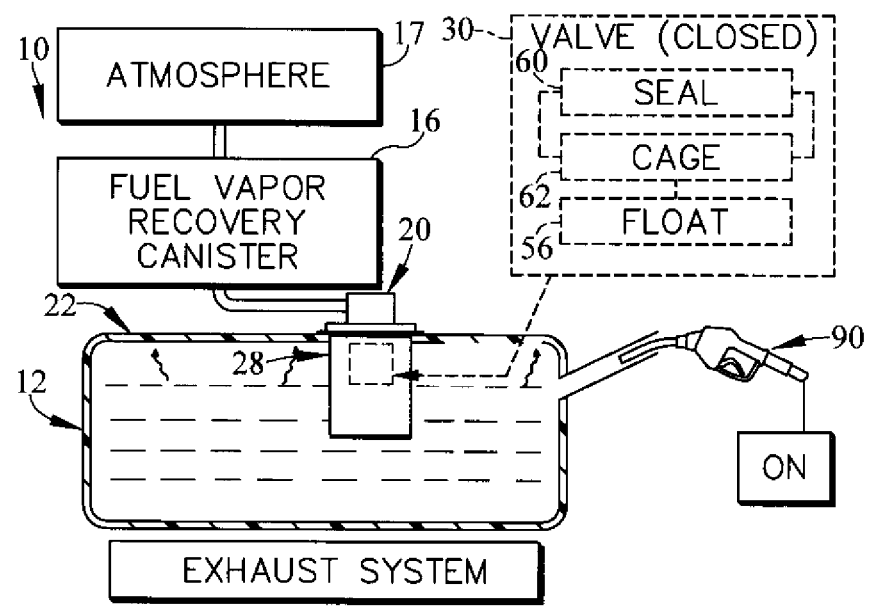
Figure 4C:
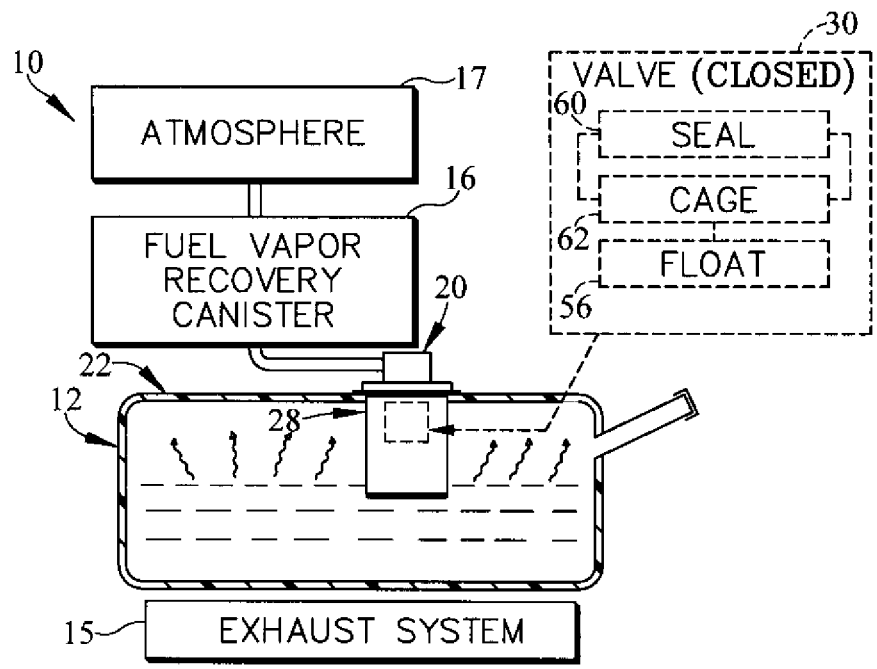
Figure 4D:
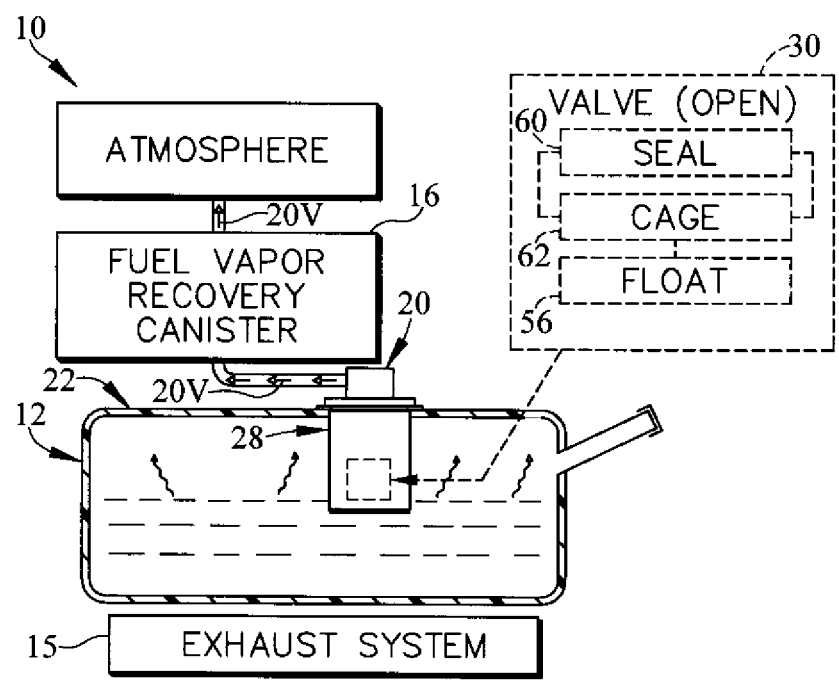

FIG. 9A is a is a cross-sectional view of the fuel tank vent apparatus of FIG. 9 taken along line 9A-9A showing the valve in the closed position with the outer vent port closure of the intermediary diaphragm in contact with the ceiling of the housing to close the vent ports of the housing and with the stem of the buoyant float in contact with the float-pusher spring to close the emission port formed in the stem pusher spring so that fuel vapor and fuel is blocked from escaping the fuel tank through the fuel tank vent apparatus;

FIG. 9B is a detail cross-sectional view of the stem of the buoyant float and the float-pusher spring of the intermediary diaphragm showing that the stem closes the emission port formed in the float-pusher spring and that the float-pusher spring is part-way deformed when the valve is in the closed position;

FIG. 9C is a diagrammatic force balance of the buoyant float corresponding to the buoyant float when the valve is in the closed position showing the buoyant float lifted up by the force of the bias spring and the force of buoyancy and pushed down by the force of gravity and by a small force applied by the float-pusher spring;

FIG. 10 is a perspective view of a portion of the fuel tank vent apparatus when the valve is in the closed position after the fuel level in the fuel tank is lowered corresponding to FIG. 4C showing that fuel vapor is allowed to enter the fuel tank vent apparatus through the inlet ports of the housing but is blocked from exiting the fuel tank vent apparatus through the vent ports;

FIG. 10A is a is a cross-sectional view of the fuel tank vent apparatus of FIG. 10 taken along line 10A-10A showing the valve in the closed position while pressure is built up in the housing to deform the float-pusher spring and store additional energy in the float-pusher spring that is in turn applied to the buoyant float, pushing the buoyant float away from the vent ports formed in the ceiling of the housing to open the emission port;

FIG. 10B is a detail cross-sectional view of the stem of the buoyant float and the float-pusher spring of the intermediary diaphragm showing that the stem closes the emission port formed in the float-pusher spring and that the float-pusher spring is fully deformed storing energy from pressure built up in the fuel tank that is applied to the buoyant float to push the buoyant float away from the vent ports formed in the ceiling of the housing and out of contact with the float-pusher spring to open the emission port as shown in FIGS. 11A and 11B;

FIG. 10C is a diagrammatic force balance of the buoyant float corresponding to the buoyant float when the buoyant float is in the closed position and the float-pusher spring is fully deformed showing the buoyant float lifted up by the force of the bias spring and pushed down by the force of gravity and by a large force applied by the float-pusher spring;

FIG. 11 is a perspective view of a portion of the fuel tank vent apparatus when the buoyant float moved away from the intermediary diaphragm and the valve is in the process of opening showing that fuel vapor is allowed to enter the fuel tank vent apparatus through the inlet ports of the housing and is beginning to escape through the vent ports;

FIG. 11A is a is a cross-sectional view of the fuel tank vent apparatus of FIG. 11 taken along line 11A-11A showing the buoyant float moved away from the intermediary diaphragm and the valve moving to the open position, and showing that arms of the seal support are contacted by the buoyant float as the buoyant float falls away from the ceiling of the housing to pull the intermediary diaphragm away from the vent ports formed in the ceiling of the housing to completely open the valve as shown in FIGS. 12 and 12A;

FIG. 11B is a detail cross-sectional view of the stem of the buoyant float and the float-pusher spring of the intermediary diaphragm showing that the stem is moved away from the emission port formed in the float-pusher spring;

FIG. 11C is a diagrammatic force balance of the buoyant float corresponding to the buoyant float when the valve is opening showing the buoyant float lifted up by the force of the bias spring and pushed down by the force of gravity;

FIG. 12 is a perspective view of a portion of the fuel tank vent apparatus when the valve is open corresponding to FIG. 4D showing that fuel vapor is allowed to enter the fuel tank vent apparatus through the inlet ports of the housing and allowed to escape through the vent ports of the housing;

FIG. 12A is a is a cross-sectional view of the fuel tank vent apparatus of FIG. 12 taken along line 12A-12A showing the valve in the open position with the outer vent port closure of the intermediary diaphragm spaced apart from the ceiling of the housing to completely open all the vent ports of the housing so that fuel vapor is allowed to escape from the fuel tank through the fuel tank vent apparatus;

FIG. 12B is a detail cross-sectional view of the stem of the buoyant float and the float-pusher spring of the intermediary diaphragm showing that the stem is in contact with the float-pusher spring but that the float-pusher spring is not deformed and is not storing energy; and FIG. 12C is a diagrammatic force balance of the buoyant float corresponding to the buoyant float when the valve is opening showing the buoyant float lifted up by the force of the bias spring and by the force of buoyancy applied when the buoyant float is supported by remaining fuel in the fuel tank and pushed down by the force of gravity.

DETAILED DESCRIPTION

A fuel storage system 10 includes a fuel tank 12, a fuel vapor recovery canister 16, and a fuel tank vent apparatus 20 as shown, for example, in FIG. 1. Fuel vapor recovery canister 16 is located outside fuel tank 12. Fuel tank vent apparatus 20 is configured to vent pressurized fuel vapor from fuel tank 12 to fuel vapor recovery canister 16 when pressure in fuel tank 12 is greater than atmospheric pressure outside fuel tank 12 and liquid fuel levels are low enough to avoid sloshing of fuel out of fuel tank 12 as suggested by arrows 20V in FIGS. 4A and 4D.

Figure 6:
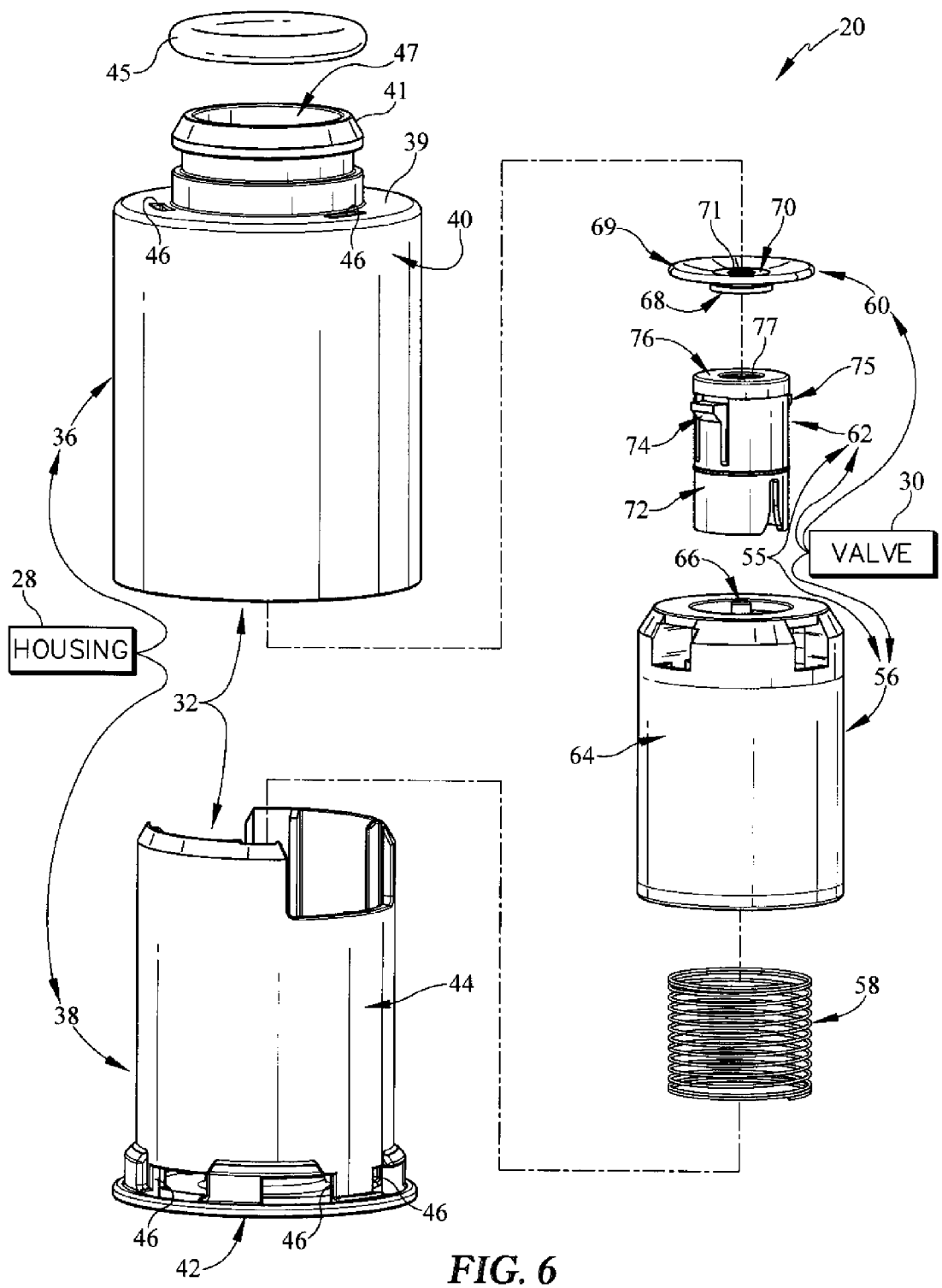

Fuel tank vent apparatus 20 includes a housing 28, a valve 30, and a bias spring 58 as shown in FIG. 6. Housing 28 is adapted to be mounted in top wall 22 of fuel tank 12 as shown in FIG. 1. Valve 30 is movable within an internal space 32 formed by housing 28 from an open position, shown in FIGS. 4A and 8A, to a closed position shown in FIGS. 4B and 9A. Valve 30 is configured to assume the open position when the liquid fuel level in fuel tank 12 is low allowing fuel vapor to escape fuel tank 12 as shown in FIGS. 4A and 9A. Valve 30 is configured to assume the closed position when the liquid fuel level in fuel tank 12 is high blocking liquid fuel and fuel vapor from escaping fuel tank 12, as shown in FIGS. 4B and 10A.

Figure 5:
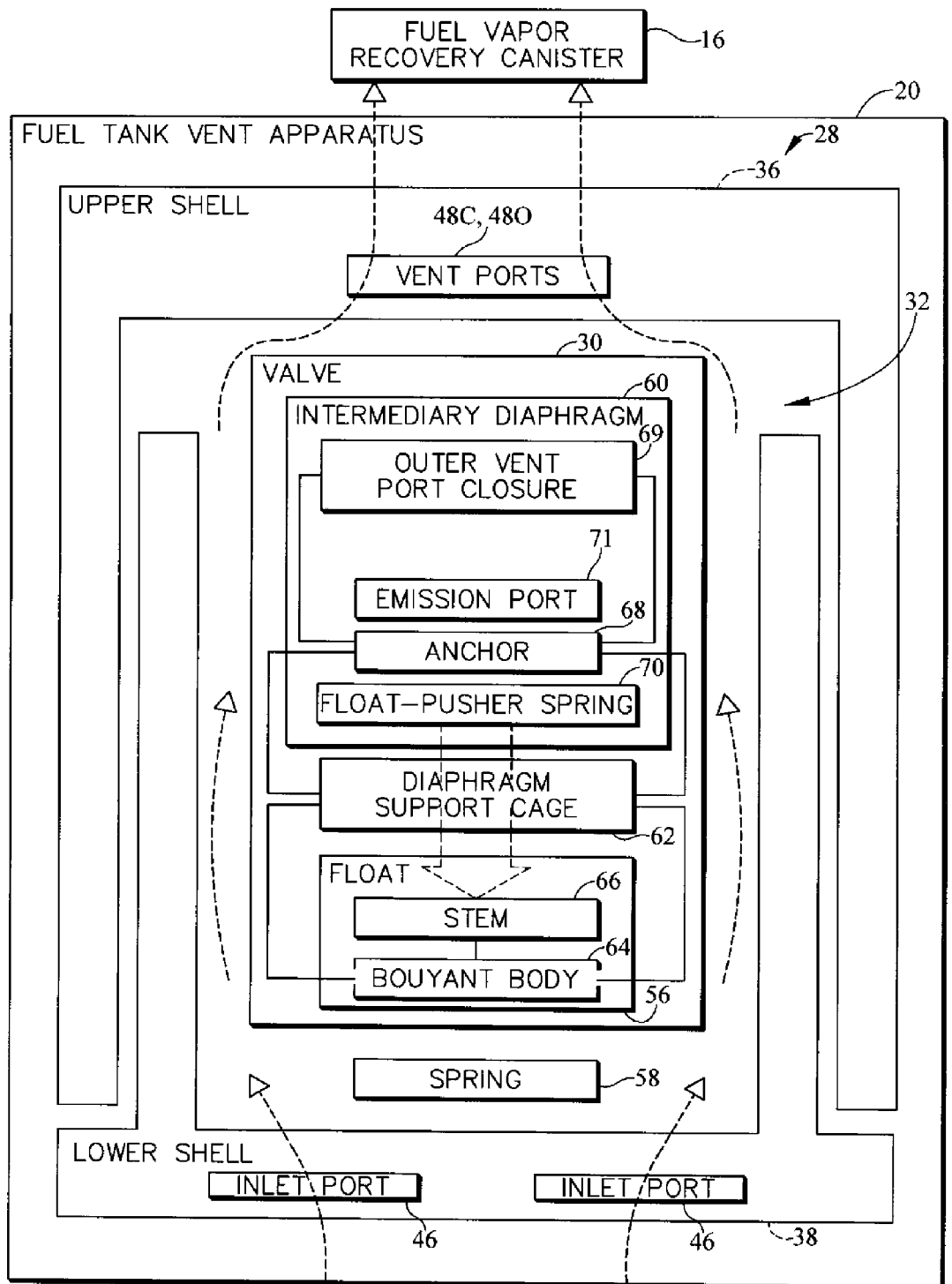
Figure 7:
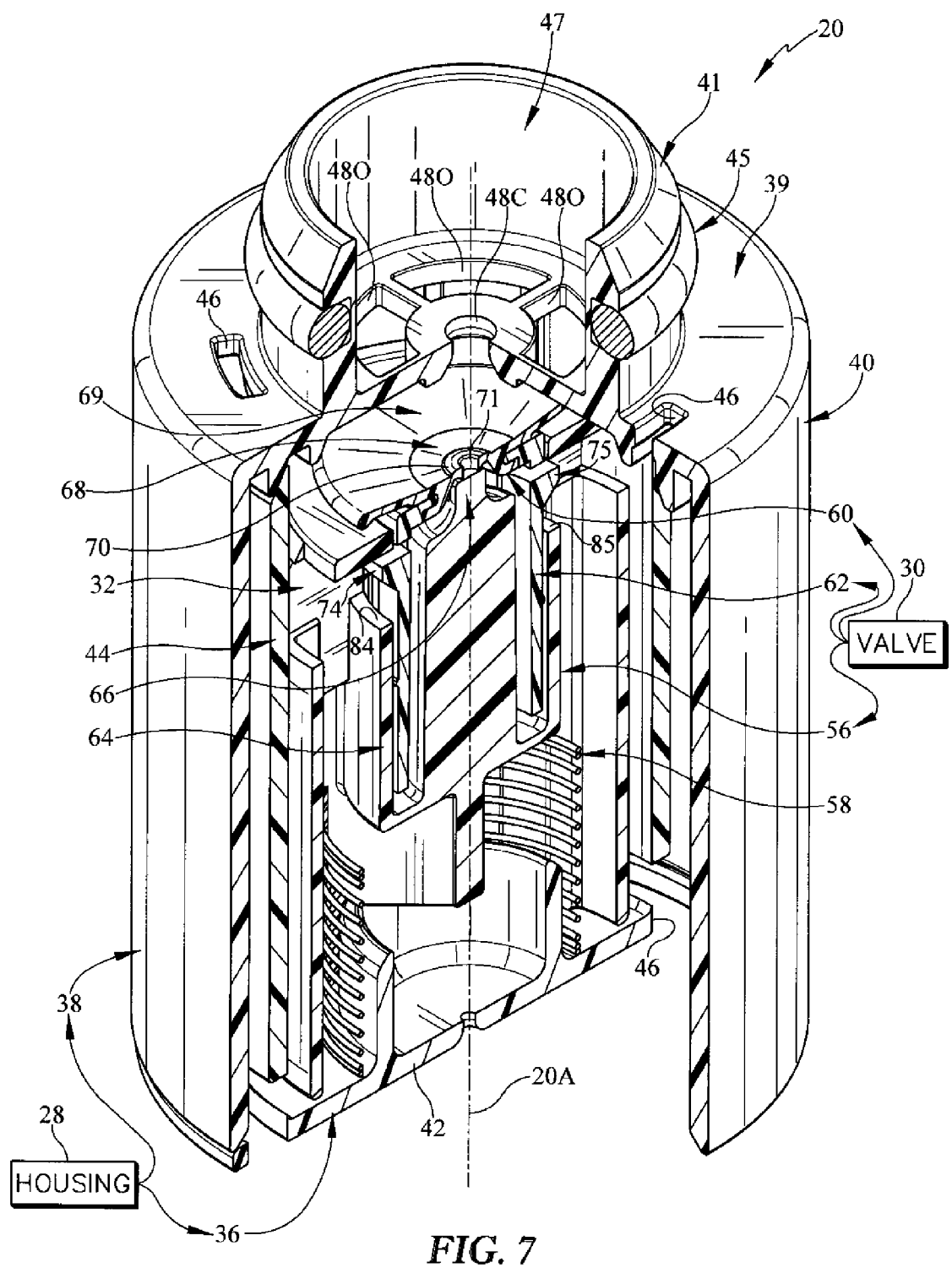

Valve 30 includes a buoyant float 56 and an intermediary diaphragm 60 as shown illustratively in FIGS. 5-7. Buoyant float 56 is buoyant and causes valve 30 to be raised (closed) and lowered (opened) depending on the fuel level in fuel tank 12. Intermediary diaphragm 60 is arranged between buoyant float 56 and vent ports 48C, 48O formed in housing 28. Intermediary diaphragm 60 cooperates with buoyant float 56 to block fuel vapor from escaping housing 28 through vent ports 48C, 48O when valve 30 is closed.

Figure 3A:
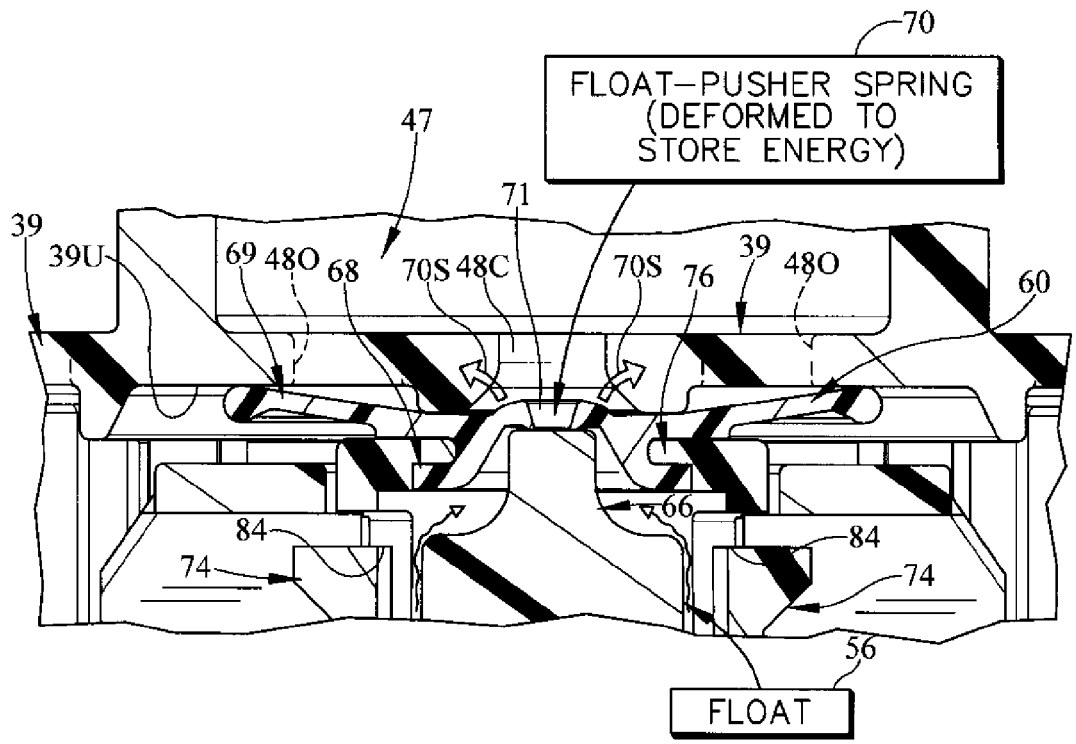
Figure 3B:
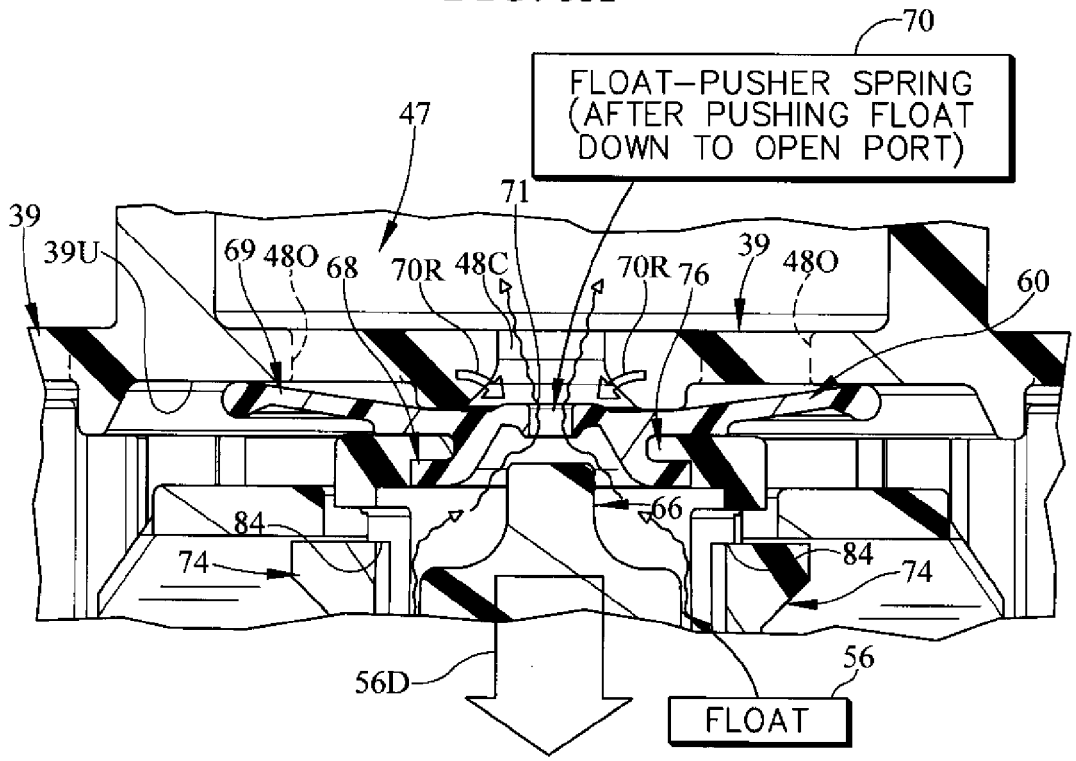

Intermediary diaphragm 60 is illustratively formed to include an emission port 71 and a float-pusher spring 70 as shown in FIG. 3. Emission port 71 is closed by buoyant float 56 when buoyant float 56 is lifted by high levels liquid fuel in fuel tank 12 as shown in FIG. 2. Float-pusher spring 70 of intermediary diaphragm 60 is configured to store energy, as suggested by arrows 70S in FIG. 3A, and to apply the stored energy to buoyant float 56 to push buoyant float 56 downwardly away from the emission port, as suggested by arrows 70R and 56D in FIG. 3B, to open emission port 71. Float-pusher spring 70 thereby opens emission port 71 to allow some fuel vapor to escape housing 28 through emission port 71 and a central vent port 48C formed in the housing 28 so that valve 30 is able to re-open, releasing pressure in fuel tank 12.

Housing 28 of fuel tank vent apparatus 20 includes an upper shell 36 and a lower shell 38 that cooperate to form internal space 32 as shown illustratively in FIGS. 5 and 6. Upper shell 36 includes a ceiling 39 (sometimes called a top wall), a flange 41 extending up from ceiling 39 to engage top wall 22 of the fuel tank 12, and a cylindrical outer side wall 40 extending down from the ceiling 39. Lower shell 38 includes a floor 42 and a cylindrical inner side wall 44 extending up from floor 42. Housing 28 also includes an O-ring 45 that extends around flange 41 to provide vapor-sealed mounting of flange 41 to top wall 22 of fuel tank 12.

Upper shell 36 and lower shell 38 are formed to include inlet ports 46 providing fluid communication between an interior 49 of fuel tank 12 and internal space 32 of housing 28 as shown, for example, in FIG. 8A. Inlet ports 46 allow fuel and fuel vapor to enter housing 28 as suggested by arrows 40E in FIG. 8. Upper shell 36 is also formed to include a central vent port 48C and outer vent ports 48O located inside a perimeter of flange 41 and extending through the ceiling 39. Outer vent ports 48O are spaced outward a radial direction from central vent port 48C and are arranged around central vent port 48C. Vent ports 48C, 48O provide communication from internal space 32 of housing 28 to an upper receiving chamber 47 defined by flange 41. Upper receiving chamber 47 is in fluid communication with fuel vapor recovery canister 16 as shown in FIG. 2.

Valve 30 includes buoyant float 56, intermediary diaphragm 60, and a diaphragm-support cage 62 as shown, for example, in FIGS. 5-7. Buoyant float 56 is configured to be lifted by a buoyant force $F_B$ provided by liquid fuel in the fuel tank 12. Bias spring 58 contacts buoyant float 56 and housing 28 to provide a spring force $F_{S1}$ that pushes buoyant float 56 upwardly so that only a minor buoyant force $F_B$ is needed to overcome weight $F_W$ of buoyant float 56 during lifting of buoyant float 56 as suggested in the force diagram of FIG. 9C. Intermediary diaphragm 60 is arranged between buoyant float 56 and ceiling 39 of housing 28 so that intermediary diaphragm 60 is lifted with buoyant float 56 as the fuel level in fuel tank 12 rises. Diaphragm-support cage 62 is coupled to intermediary diaphragm 60 and is coupled to buoyant float 56. Diaphragm-support cage 62 and buoyant float 56 cooperate to provide a diaphragm carrier 55 that lifts intermediary diaphragm 60 when liquid fuel levels in fuel tank 12 rise. Diaphragm-support cage 62 allows buoyant float 56 to move downwardly away from intermediary diaphragm 60 when liquid fuel levels in fuel tank 12 fall providing a predetermined amount of lost motion between the buoyant float 56 and intermediary diaphragm 60 during re-opening of valve 30.

Buoyant float 56 is illustratively a monolithic component formed from a buoyant body 64 and a stem 66 as shown illustratively in FIGS. 6 and 7. Buoyant body 64 is coupled to and surrounds stem 66. Stem 66 extends up from buoyant body 64 and cooperates with intermediary diaphragm 60 to close vent ports 48C, 48O to block venting of fuel tank 12 when valve 30 is in the closed position as shown in FIG. 9A.

Intermediary diaphragm 60 is illustratively a monolithic elastic component formed from an anchor 68, an outer vent port closure 69, and a float-pusher spring 70 as shown, for example, in FIGS. 5 and 6. In the illustrative embodiment, intermediary diaphragm 60 is made from an elastic fluorosilicone material but in other embodiments may be made from another suitable elastic material. Anchor 68 is coupled to diaphragm-support cage 62 when intermediary diaphragm 60 is formed by over molding material onto diaphragm-support cage 62 as suggested in FIG. 7. Outer vent port closure 71 extends outwardly in the radial direction from anchor 68. Float-pusher spring extends inwardly in the radial direction from anchor 68.

Anchor 68 illustratively includes an annular interior body 681, an upper leg 682, and a lower leg 683 that cooperate to define a radially-outwardly opening channel 684 as shown in FIG. 3. Interior body 681 extends downwardly from float pusher spring 70. Upper leg 682 extends outward in the radial direction from the interior body 681. Lower leg 683 extends outward in the radial direction from the interior body 681. Radially-outwardly opening channel 684 receives a top wall 76 of the diaphragm-support cage that surrounds an opening 77 formed in top wall 76 of diaphragm-support cage 62.

Outer vent port closure 69 extends from upper leg 682 of anchor 68 as shown in FIG. 3. Outer vent port closure 69 includes a frustoconical wall 691 that extends outwardly in the radial direction and upwardly in the axial direction from the anchor 68 and a reinforcement ring 692 that extends downwardly from the wall 691 around the outer circumference of the wall 691. Outer vent port closure 69 contacts an underside 39U of ceiling 39 to close outer vent ports 48O when valve 30 is in the closed position.

Float-pusher spring 70 extends from upper leg 681 of anchor 68 as shown in FIG. 3. Float pusher spring 70 is configured bow upwardly along axis 20A and to push downward in the axial direction along axis 20A on the stem 66 of buoyant float 56 when the valve 30 is in the closed position as shown in FIGS. 9-10. Float-pusher spring 70 surrounds and defines emission port 71 that is closed by the stem 66 of the buoyant float 56 when valve 30 is in the closed position.

Float-pusher spring 70 is formed to include a flange 92 and an annular tang 94 coupled to the flange 92 as shown in FIG. 3. Flange 92 extends inward in the radial direction from anchor 68 as shown in FIGS. 9A and 9B. Tang 94 extends inward in the radial direction and downward in the axial direction from flange 92 as shown in FIG. 3. Tang 94 extends around and defines emission port 71.

Diaphragm-support cage 62 is coupled to the buoyant float 56 for slidable movement relative to buoyant float 56 as shown, for example, in FIG. 7. Diaphragm-support cage 62 is a monolithic component formed to include a cylindrical body 72 and a pair of arms 74, 75 coupled to cylindrical body 72 as shown in FIG. 6. Cylindrical body 72 includes a top wall 76 formed to include a round opening 77 and a side wall 78 extending down from the top wall 76.

Anchor 68 of intermediary diaphragm 60 is coupled to top wall 76 of diaphragm-support cage 62 by over molding anchor 68 on to top wall 76 around opening 77 as shown in FIG. 7. As a function of the coupling of the top wall 76 and anchor 68, intermediary diaphragm 70 and seal support cage 68 move together. Side wall 78 is located between buoyant body 64 and stem 66 of buoyant float 56 as shown in FIGS. 7 and 8A. Pair of arms 74, 75 extend radially outwardly from side wall 78 and are received in slots 84, 85 formed in buoyant body 64 of buoyant float 56 as shown in FIG. 7.

Valve 30 is moved to the open position as suggested by arrow 30D in FIG. 12A when the fuel level in fuel tank 12 is lowered during vehicle operation as suggested in FIG. 4A. When valve 30 is in the open position, fuel vapor that enters housing 28 of fuel tank vent apparatus 20 is free to vent out of housing 28 as suggested by arrows 20V in FIGS. 4A, 8, and 8A. Valve 30 in the open position is spaced apart from ceiling 39 of housing 28 so that vent ports 48C, 48O are opened allowing fuel vapor to escape housing 28 toward fuel vapor recovery canister 16 and atmosphere 17 as shown in FIGS. 1 and 8A.

Valve 30 is moved to the closed position as suggested by arrow 30U when the fuel level in fuel tank 12 is raised during refueling from a pump 90 as suggested in FIG. 4B. Rising fuel level in fuel tank 12 causes the buoyant force $F_B$ to be applied to the buoyant float 56 raising valve 30 to the closed position as suggested in FIGS. 9A and 9C. When valve 30 is moved to the closed position, fuel vapor that enters housing 28 of tank vent apparatus 20 is blocked from venting out of housing 28 as suggested in FIGS. 4B, 9, and 9A. Valve 30 in the closed position contacts ceiling 39 of housing 28 so that vent ports 48C, 48O are closed blocking fuel vapor from escaping housing 28 toward fuel vapor recovery canister 16 as shown in FIG. 9A.

In the closed position, intermediary diaphragm 60 and buoyant float 56 cooperate to close vent ports 48C, 48O off from internal space 32 of housing 28 as shown in FIG. 4A. Specifically, outer vent port closure 69 of intermediary diaphragm 60 contacts ceiling 39 of housing 28 to close outer vent ports 48O of housing 28 and stem 66 of buoyant float 56 contacts float-pusher spring 70 to close emission port 71 formed in float-pusher spring 70 and aligned with central vent port 48C so that fuel vapor and fuel is blocked from escaping fuel tank 12 through fuel tank vent apparatus 20. Contact of stem 66 with float-pusher spring 70 causes float-pusher spring 70 to be part-way deformed and to apply a second spring force $F_{S2}$ that resists further upward movement of buoyant float 56 as shown in FIGS. 9B and 9C.

To move valve 30 back to the open position, a two-stage re-opening process is initiated by intermediary diaphragm 60 as suggested in FIGS. 11-12B. The first stage of re-opening is performed by the intermediary diaphragm 60 that pushes buoyant float 56 away from intermediary diaphragm 60 and ceiling 39 of housing 28 as suggested in FIGS. 3B and 11A. The second stage of re-opening is performed by buoyant float 56 that pulls the intermediary diaphragm 60 away from ceiling 39 of housing 28 as suggested in FIG. 12A.

During the first stage of reopening, pressure may build in housing 28 as a result of atmospheric conditions and/or heat applied to the fuel in fuel tank 12 from an exhaust system 15 as suggested in FIG. 4C. The built up pressure causes float-pusher spring 70 to be fully deformed, as suggested by arrows 70S in FIG. 3A, storing energy that is in turn applied to the stem 66 of buoyant float 56 as suggested in FIG. 10B. The energy stored in float-pusher spring 70 is applied to stem 66 until the weight of the buoyant float $F_W$ and the second spring force $F_{S2}$ exceeds the first spring force $F_{S1}$ from bias spring 58 and the force of buoyancy $F_B$ which causes buoyant float 56 to be pushed downwardly as suggested by arrows 70R and 56D in FIG. 3B and as shown in FIGS. 11A and 11B.

During the second stage of reopening, buoyant float 56 is moved downwardly away from intermediary diaphragm 60 and ceiling 39 of the housing 28 as suggested in FIG. 11A. Top edges 84T, 85T of slots 84, 85 of buoyant float 56 then contact arms 74, 75 of diaphragm-support cage 62 as shown in FIG. 11A. As buoyant float 56 continues to move downwardly away from the ceiling 39 of housing 28, diaphragm-support cage 62 and intermediary diaphragm 60 are pulled away from ceiling 39 of housing 28 so that valve 30 returns to the open position in which the central vent port 48C and the outer vent ports 48O are open as shown in FIG. 12A.

The invention claimed is:

1. A fuel tank vent apparatus for controlling discharge of fuel vapor from a fuel tank, the apparatus comprising
a top wall formed to include a central vent port, a series of outer vent ports arranged to surround the central vent port, and a vapor-receiving chamber placed in fluid communication with each of the central and outer vent ports and adapted to communicate with an external fuel-vapor recovery canister,
a diaphragm carrier including a buoyant float arranged to float up and down relative to the top wall on rising and falling levels of liquid fuel in a fuel tank containing the buoyant float and a diaphragm-support cage coupled to the buoyant float for movement therewith when the buoyant float is lifted upwardly on rising levels of liquid fuel in the tank, the buoyant float including a buoyant body and an upstanding stem coupled to the buoyant body and located between the buoyant body and the central vent port, and
an intermediary diaphragm positioned to lie between the buoyant float and the central and outer vent ports formed in the top wall, wherein the intermediary diaphragm includes an anchor coupled to the diaphragm-support cage, an outer port closure arranged to extend radially outwardly away from the anchor to contact the top wall and close the outer vent ports upon upward movement of the buoyant float toward the central vent port, and a float-pusher spring arranged to extend radially inwardly from the anchor to a point above the diaphragm-support cage and to lie in a position below the central vent port and above the stem of the buoyant float and to cooperate with the stem to close the central vent port upon upward movement of the buoyant float toward the central vent port, and the float-pusher spring is configured to provide reopening means for deforming under a compression load applied by upward movement of the stem toward the central vent port to store energy during upward movement of the buoyant float toward the central vent port and releasing the stored energy to apply a downward force to the stem of the buoyant float to push the stem downwardly to disengage and separate from the float-pusher spring during falling levels of liquid fuel in the fuel tank to allow fuel vapor extant in the fuel tank to flow through a space provided between the separated float-pusher spring and stem to and through the central vent port while the outer port closure remains in contact with the top wall to close the outer vent ports.

2. The apparatus of claim 1, wherein the anchor, the outer vent port closure, and the float-pusher spring are made of an elastic deformable material to form the intermediary diaphragm as a monolithic component.

3. The apparatus of claim 2, wherein the float-pusher spring is an annular flange formed to include an emission port therein to provide means for conducting fuel vapor from the fuel tank to the central vent port and a downwardly-extending annular tang arranged to mate with an upwardly-facing surface of the stem of the buoyant float to close the emission port when the buoyant float moves upwardly toward the central vent port on rising liquid fuel in the fuel tank.

4. The apparatus of claim 3, wherein the outer-port closure is ring-shaped to surround the annular flange of the float-pusher spring and has a frustoconical shape characterized by a concave surface facing toward the top wall and a convex surface facing away from the top wall.

5. A fuel tank vent apparatus for controlling the discharge of fuel vapor from a fuel tank, the apparatus comprising
a housing adapted to be mounted in a top wall of a fuel tank, the housing defining an internal space and formed to include an inlet port adapted for communication with an interior region of the fuel tank and a central vent port adapted for communication with a fuel vapor recovery canister outside the fuel tank, and
a valve disposed in the internal space of the housing and mounted for movement along an axis from a closed position arranged to block fuel vapor from escaping the housing through the central vent port to an open position arranged to allow fuel vapor to escape the housing through the central vent port, the valve including a buoyant float adapted to be lifted and lowered by liquid fuel present in the internal space and an intermediary diaphragm mounted to be lifted with the buoyant float and to allow the buoyant float to lower independent of the intermediary diaphragm,
wherein the intermediary diaphragm is formed to include an emission port that is closed by the buoyant float when the valve is in the closed position and the intermediary diaphragm includes
a float-pusher spring arranged between the housing and the buoyant float and arranged to engage the buoyant float when the valve is in the closed position,
wherein the intermediary diaphragm includes an anchor, the anchor is arranged to extend outwardly from the float-pusher spring in a radial direction away from the axis, the anchor is arranged to extend downwardly from the float-pusher spring in an axial direction along the axis, and the anchor is arranged to contact the housing around the central vent port when the valve is in the closed position, and
wherein the float-pusher spring included in the intermediary diaphragm is arranged entirely above a lowest portion of the anchor included in the intermediary diaphragm.

6. The fuel tank vent apparatus of claim 5, wherein the buoyant float includes a buoyant body having a first diameter and a stem having a second diameter smaller than the first diameter, the stem is sized to close the emission port, and the float-pusher spring contacts the stem of the buoyant float when the valve is in the closed position.

7. The fuel tank vent apparatus of claim 5, wherein the intermediary diaphragm includes an outer vent port closure, the anchor is the outer vent port closure is arranged to extend outwardly from the anchor in a radial direction away from the axis, and the outer vent port closure is sized to close at least one outer vent port arranged outwardly in the radial direction from the central vent port.

8. The fuel tank vent apparatus of claim 7, wherein the float-pusher spring includes a flange arranged to extend inwardly in a radial direction from the anchor toward the axis so that the flange extends under a portion of the central vent port and an annular tang arranged to extend downward in an axial direction from the flange toward the buoyant float.

9. The fuel tank vent apparatus of claim 7, wherein the intermediary diaphragm is a monolithic component formed from an elastic material.

10. The fuel tank vent apparatus of claim 7, wherein the valve includes a diaphragm-support cage and the anchor is coupled to the diaphragm-support cage so that the diaphragm-support cage and the intermediary diaphragm move together along the axis.

11. The fuel tank vent apparatus of claim 10, wherein the diaphragm-support cage includes a body arranged to extend around the axis and an arm arranged to extend outward from the body in a radial direction away from the axis and into a slot formed in the buoyant float.

12. The fuel tank vent apparatus of claim 11, wherein the slot formed in the buoyant float is sized to allow movement of the buoyant float relative to the diaphragm-support cage along the axis when the buoyant float is moved downwardly away from the central vent port formed in the housing during uncovering of the emission port and to block movement of the buoyant float relative to the diaphragm-support cage along the axis of the housing at a predetermined point during movement away from the central vent port so that the buoyant float pulls the diaphragm-support cage and intermediary diaphragm away from the central vent port thereby opening the valve when the buoyant float moves past the predetermined point.

13. A fuel tank vent apparatus for controlling the discharge of fuel vapor from a fuel tank, the apparatus comprising
  a housing including a side wall formed to include an inlet port and a ceiling formed to include a central vent port, the side wall and the ceiling cooperating to define an internal space interconnecting the inlet port and the central vent port,
  a valve disposed in the internal space defined by the housing and mounted for movement from a closed position arranged to block fuel vapor from escaping the internal space through the central vent port to an open position arranged to allow fuel vapor to escape the internal space through the central vent port, the valve including a buoyant float adapted to be lifted toward the ceiling by liquid fuel in the internal space and an intermediary diaphragm arranged between the ceiling of the housing and the buoyant float, the intermediary diaphragm formed to include an emission port that is closed by the buoyant float when the valve is in the closed position and including a float-pusher spring configured to push the buoyant float downwardly within the internal space away from the emission port to open the emission port when the buoyant float is not held in contact with the intermediary diaphragm by liquid fuel lifting the buoyant float toward the ceiling,
  wherein the valve includes a diaphragm-support cage coupled to the buoyant float to allow a predetermined amount of relative movement between the diaphragm-support cage and the buoyant float in an axial direction, the intermediary diaphragm includes an anchor coupled to the float-pusher spring and to the diaphragm-support cage so that the float-pusher spring is coupled to the diaphragm-support cage for movement therewith and to the buoyant float to allow a predetermined amount of relative movement between the float-pusher spring and the buoyant float, and the float-pusher spring includes a flange spaced apart from the emission port that is arranged to extend inward in a radial direction and upward in an axial direction from the anchor when the float-pusher spring is not deformed by the buoyant float being lifted by liquid fuel in the internal space such that the valve is in the closed position and an annular tang arranged to extend downward in an axial direction from the flange.

14. The fuel tank vent apparatus of claim 13, wherein the housing is formed to include an outer vent port arranged outwardly in the radial direction from the central vent port, the intermediary diaphragm includes an outer vent port closure arranged to extend outwardly in the radial direction from the anchor, the outer vent port closure contacts the ceiling of the housing when the valve is in the closed position, and the outer vent port closure is sized to close the outer vent port when the valve is in the closed position.

15. The fuel tank vent apparatus of claim 13, wherein the anchor forms an annular, radially-outwardly opening channel that receives a top wall of the diaphragm-support cage that surrounds an opening formed in the top wall of the diaphragm-support cage.

16. The fuel tank vent apparatus of claim 13, wherein the housing is formed to include an outer vent port arranged outwardly in a radial direction from the central vent port and the intermediary diaphragm includes an outer vent port closure coupled to the float-pusher spring and sized to close the outer vent port when the valve is in the closed position.

17. The fuel tank vent apparatus of claim 16, wherein the valve moves along a central axis of the housing from the closed position to the open position and the float-pusher spring is arranged to surround the central axis along which the valve moves.

18. The fuel tank vent apparatus of claim 13, wherein the diaphragm-support cage includes a body received in the buoyant float and an arm arranged to extend outwardly from the body in a radial direction into a slot formed in the buoyant float.

19. The fuel tank vent apparatus of claim 18, wherein the slot formed in the buoyant float is sized to allow movement of the buoyant float downwardly relative to the diaphragm-support cage in the axial direction when the buoyant float is moved away from the central vent port of the housing during opening of the emission port and to block movement of the buoyant float relative to the diaphragm-support cage at a predetermined point so that the buoyant float pulls the diaphragm-support cage and intermediary diaphragm downwardly away from the ceiling of the housing thereby opening the valve when the buoyant float moves downwardly past the predetermined point.

20. A fuel tank vent apparatus for controlling the discharge of fuel vapor from a fuel tank, the apparatus comprising
  a housing defining an internal space, the housing formed to include an inlet port and a central vent port interconnected by the internal space, and
  a valve mounted in the internal space for movement from a closed position arranged to block fuel vapor from escaping the internal space through the central vent port to an open position arranged to allow fuel vapor to escape the internal space through the central vent port, the valve including a buoyant float and an intermediary diaphragm arranged between the buoyant float and the central vent port, the intermediary diaphragm formed to define an emission port and including an anchor that contacts the housing around the central vent port when the valve is in the closed position and a float-pusher spring that contacts the buoyant float when the valve is in the closed position, the float-pusher spring configured to deflect relative to the anchor into the central vent port formed by the housing to store energy when the valve is in the closed position and to apply the stored energy downwardly onto the buoyant float when the valve is in the closed position, wherein the buoyant float closes the emission port formed in the intermediary diaphragm when the valve is in the closed position, and wherein the housing is formed to include an outer vent port arranged outwardly in the radial direction from the central vent port, the intermediary diaphragm includes an outer vent port closure arranged to extend outwardly in the radial direction from the anchor, the outer vent port closure contacts the ceiling of the housing when the valve is in the closed position, and the outer vent port closure is sized to close the outer vent port when the valve is in the closed position.

21. The fuel tank vent apparatus of claim 20, wherein the intermediary diaphragm is a monolithic elastic component.

* * * * *